(12) United States Patent
Park et al.

(10) Patent No.: US 12,027,906 B2
(45) Date of Patent: Jul. 2, 2024

(54) ELECTRONIC DEVICE FOR STOPPING CHARGING OF BATTERY AND/OR PROVIDING USER INTERFACE BASED ON OVER-DISCHARGED STATE OF BATTERY AND METHOD FOR CONTROLLING SAME

(71) Applicant: Samsung Electronics Co., Ltd., Suwon-si (KR)

(72) Inventors: Soochan Park, Suwon-si (KR); Wonwook Lee, Suwon-si (KR); Taeyoun Kwon, Suwon-si (KR); Hyunjae Kim, Suwon-si (KR); Jinsung Park, Suwon-si (KR); Changmin Oh, Suwon-si (KR); Jinyoung Jang, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 482 days.

(21) Appl. No.: 17/500,135

(22) Filed: Oct. 13, 2021

(65) Prior Publication Data

US 2022/0115895 A1   Apr. 14, 2022

Related U.S. Application Data

(63) Continuation of application No. PCT/KR2021/013672, filed on Oct. 6, 2021.

(30) Foreign Application Priority Data

Oct. 14, 2020   (KR) .................. 10-2020-0132922
Dec. 7, 2020    (KR) .................. 10-2020-0169550

(51) Int. Cl.
      *H02J 7/00* (2006.01)

(52) U.S. Cl.
      CPC .... *H02J 7/007182* (2020.01); *H02J 7/00034* (2020.01); *H02J 7/00308* (2020.01); *H02J 7/0049* (2020.01); *H02J 2310/22* (2020.01)

(58) Field of Classification Search
      None
      See application file for complete search history.

(56) References Cited

U.S. PATENT DOCUMENTS 5,818,201 A * 10/1998 Stockstad ........... H02J 7/00308
                                                              320/118
6,150,797 A * 11/2000 Mukainakano ....... H02J 7/0031
                                                              320/136

(Continued)

FOREIGN PATENT DOCUMENTS

JP   H09-327130 A   12/1997
JP   2003-264937 A   9/2003

(Continued)

OTHER PUBLICATIONS

International Search Report dated Jan. 11, 2022, issued in International Application No. PCT/KR2021/013672.

(Continued)

*Primary Examiner* — Arun C Williams
(74) *Attorney, Agent, or Firm* — Jefferson IP Law, LLP

(57) ABSTRACT

An electronic device is provided. The electronic device includes at least one battery, a charging circuit, a display, at least one processor, and a memory, the charging circuit is configured to charge the at least one battery or supply power to the at least one processor and/or the display by receiving charging power provided from an outside, and the at least one processor is configured to operate based on at least part of the power supplied from the charging circuit while the electronic device is in an off-state, and to identify whether the at least one battery is in an overdischarged state, and based on identifying that the at least one battery is in the (Continued)

overdischarged state, display, on the display, at least one image representing a state of the at least one battery among a plurality of images stored in the memory.

19 Claims, 11 Drawing Sheets

(56) References Cited

U.S. PATENT DOCUMENTS

| | | | |
|---|---|---|---|
| 7,378,819 B2* | 5/2008 | Wang | H02J 7/0071 320/112 |
| 2004/0214613 A1 | 10/2004 | Shin | |
| 2005/0088100 A1* | 4/2005 | Chen | H02J 9/065 315/86 |
| 2012/0095772 A1 | 4/2012 | Asai | |
| 2012/0229288 A1 | 9/2012 | Kim | |
| 2012/0309377 A1 | 12/2012 | De Atley et al. | |
| 2015/0256006 A1 | 9/2015 | Baek et al. | |
| 2017/0012447 A1* | 1/2017 | Zhang | H02H 7/18 |
| 2018/0260019 A1 | 9/2018 | Kim et al. | |
| 2018/0267586 A1 | 9/2018 | Jung et al. | |

FOREIGN PATENT DOCUMENTS

| | | |
|---|---|---|
| JP | 2011-018560 A | 1/2011 |
| JP | 2014-519286 A | 8/2014 |
| JP | 2014-241664 A | 12/2014 |
| JP | 2017-112802 A | 6/2017 |
| KR | 10-2003-0008501 A | 1/2003 |
| KR | 10-2005-0114120 A | 12/2005 |
| KR | 10-2012-0103937 A | 9/2012 |
| KR | 10-1227951 B1 | 1/2013 |
| KR | 10-2016-0113426 A | 9/2016 |
| KR | 10-2018-0103602 A | 9/2018 |

OTHER PUBLICATIONS

Japanese Notice of Allowance dated Feb. 26, 2024, issued in Japanese Patent Application No. 2023-519921.

* cited by examiner

ELECTRONIC DEVICE FOR STOPPING CHARGING OF BATTERY AND/OR PROVIDING USER INTERFACE BASED ON OVER-DISCHARGED STATE OF BATTERY AND METHOD FOR CONTROLLING SAME

CROSS-REFERENCE TO RELATED APPLICATION(S)

This application is a continuation application, claiming priority under § 365(c), of an International application No. PCT/KR2021/013672, filed on Oct. 6, 2021, which is based on and claims the benefit of a Korean patent application number 10-2020-0132922, filed on Oct. 14, 2020, and of a Korean patent application number 10-2020-0169550, filed on Dec. 7, 2020, in the Korean Intellectual Property Office, the disclosure of each of which is incorporated by reference herein in its entirety.

TECHNICAL FIELD

The disclosure relates to an electronic device for stopping charging and/or providing a user interface (UI) based on an over-discharged state of a battery, and method for controlling same.

BACKGROUND ART

Recently, use of portable electronic devices has spread rapidly due to the development of electronic communication industries. For example, the portable electronic devices may include a mobile communication terminal for communication, and various types of electronic devices which are freely usable without restriction of a location while moving, such as a personal digital assistants (PDA), a smart phone, a tablet personal computer (tablet PC), a moving picture experts group phase 1 or phase 2 (MPEG-1 or MPEG-2) audio layer-3 (MP3) player, a laptop PC, a digital camera, a wearable device, and the like.

The portable electronic devices may be used while moving and thus, various types of batteries (e.g., a secondary cell) may be contained therein. Depending on the characteristics of a portable electronic device, various types of batteries may be used and various management methods are being developed based on the type of battery.

The above information is presented as background information only to assist with an understanding of the disclosure. No determination has been made, and no assertion is made, as to whether any of the above might be applicable as prior art with regard to the disclosure.

DETAILED DESCRIPTION OF THE INVENTION

Technical Problem

A lower voltage limit of discharge may be set for a battery which is capable of being contained in an electronic device. For example, the lower voltage limit of discharge may be set to be a voltage set within a range that does not affect the life of a battery and/or cause deterioration in performance. When the battery is discharged, a protection circuit (e.g., a protection circuit module (PCM)) that provides an overdischarge protection function may protect the battery so as not to decrease a battery voltage to be lower than or equal to the lower voltage limit of discharge.

An overdischarge phenomenon (or extreme discharge) in which a battery voltage is decreased to be lower than or equal to the lower voltage limit of discharge may occur. For example, if the battery is left in an unused state for a long time, the battery is self-discharged and may enter an overdischarged state. As another example, if the battery is used by being contained in an electronic device that does not contain the above-described protection circuit (e.g., a PCM) (or in which the protection circuit (e.g., PCM) does not operate), the battery may enter the overdischarged state.

If the battery is, for example, a Lithium-ion (Li-ion) battery, the battery may swell (e.g., a swelling phenomenon) when the battery is in the overdischarged state. In addition, if the battery is repeatedly charged and/or discharged in the overdischarged state, the insulator film (e.g., a separator) of the battery may be damaged and thus, charging and/or discharging of the battery may need to be prevented.

Aspects of the disclosure are to address at least the above-mentioned problems and/or disadvantages and to provide at least the advantages described below. Accordingly, an aspect of the disclosure is to provide an electronic device and a control method thereof, for displaying a user interface (UI) that stops use (e.g., charging) of the battery if the battery is identified as being in the overdischarged state.

Another aspect of the disclosure is to provide an electronic device and a control method thereof, for stopping charging of a battery if the battery is identified as being in the overdischarged state.

Another aspect of the disclosure is to provide an electronic device and a control method thereof, for providing information associated with a battery which is in the overdischarged state if a plurality of batteries are included and a battery that is identified as being in the overdischarged state is present among the plurality of batteries.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes at least one battery, a charging circuit, a display, at least one processor, and a memory, the charging circuit is configured to charge the at least one battery or supply power to the at least one processor and/or the display by receiving charging power provided from an outside, and the at least one processor is configured to, while the electronic device is in an off-state, operate based on at least part of the power supplied from the charging circuit, and identify whether the at least one battery is in an overdischarged state, and to display, on the display, at least one image representing a state of the at least one battery among a plurality of images stored in the memory based on identifying that the at least one battery is in the overdischarged state.

In accordance with another aspect of the disclosure, a method of controlling an electronic device is provided. The method includes an operation of operating based on at least part of power supplied from a charging circuit of the electronic device while the electronic device is in an off-state, and identifying whether at least one battery of the electronic device is in an overdischarged state, and an operation of displaying, on a display of the electronic device, at least one image representing a state of the at least one battery among a plurality of images stored in a memory of the electronic device based on identifying that the at least one battery is in the overdischarged state.

In accordance with another aspect of the disclosure, an electronic device is provided. The electronic device includes a plurality of batteries, a charging circuit, a display, at least one processor, and a memory, and the at least one processor is configured to identify whether at least one of the plurality of batteries is in overdischarged state using the charging circuit while the electronic device in an off-state, and to display at least one image indicating a state of at least one battery based on identifying that the at least one battery is in the overdischarged state, and the at least one image may include information indicating at least one battery which is in the overdischarged state among the plurality of batteries.

Advantageous Effects

According to various embodiments of the disclosure, an electronic device can display a user interface for stopping use (e.g., charging) of a battery if the battery is identified as being in an overdischarged state, so as to prevent an accident caused by damage of the battery, and can provide information associated with a cause of disorder of the electronic device.

According to various embodiments of the disclosure, an electronic device can stop charging of a battery if the battery is identified as being in the overdischarged state, so as to prevent an accident caused by damage of the battery.

According to various embodiments of the disclosure, an electronic device can provide information associated a battery which is identified as being in the overdischarged state among a plurality of batteries, so as to prevent an accident caused by damage of the battery that is in the overdischarged state.

Various effects obtained by the disclosure are not limited to the above-described effects.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR CARRYING OUT THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
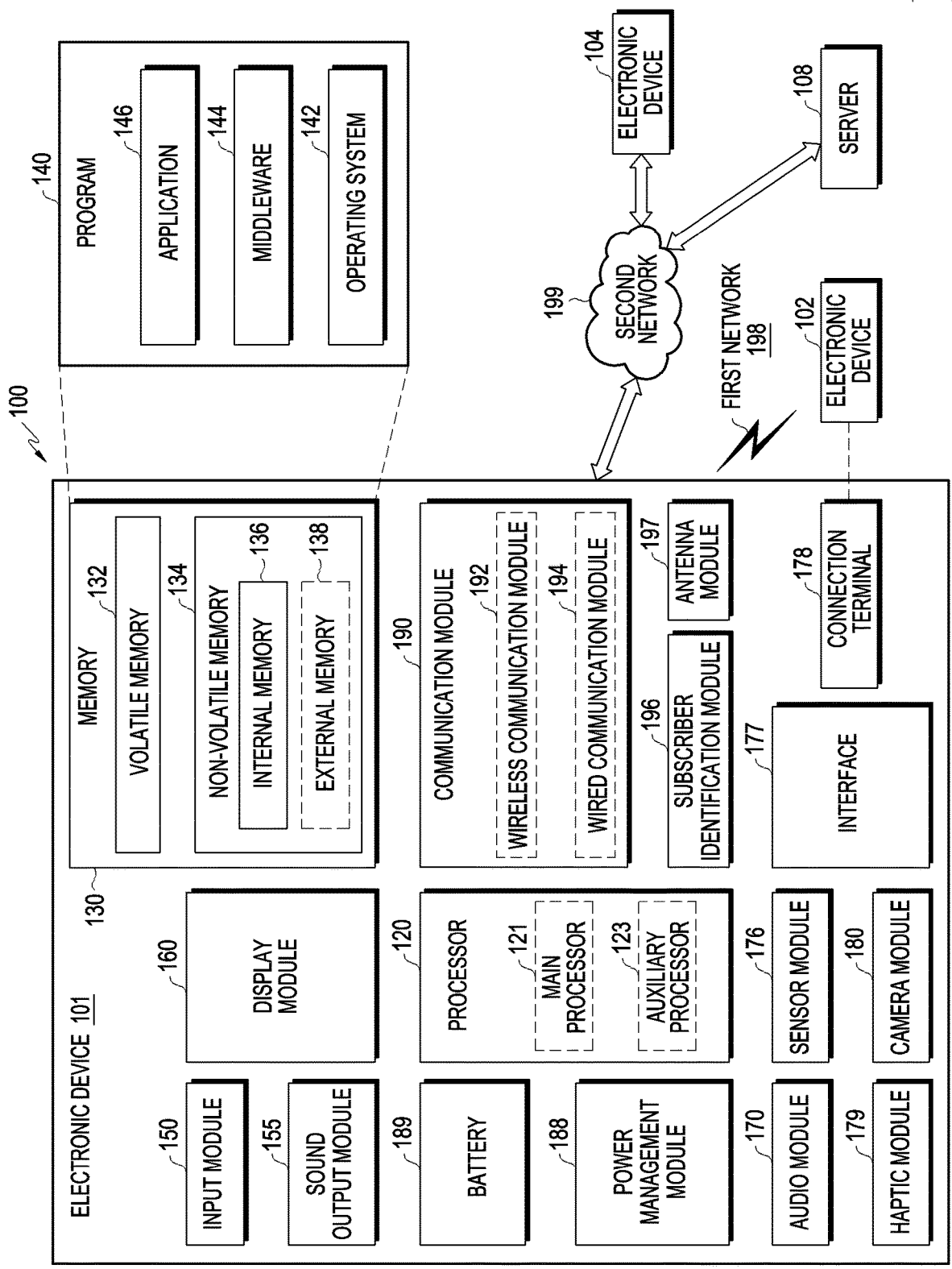
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or an external electronic device (e.g., an external electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a $5^{th}$ generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a $4^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
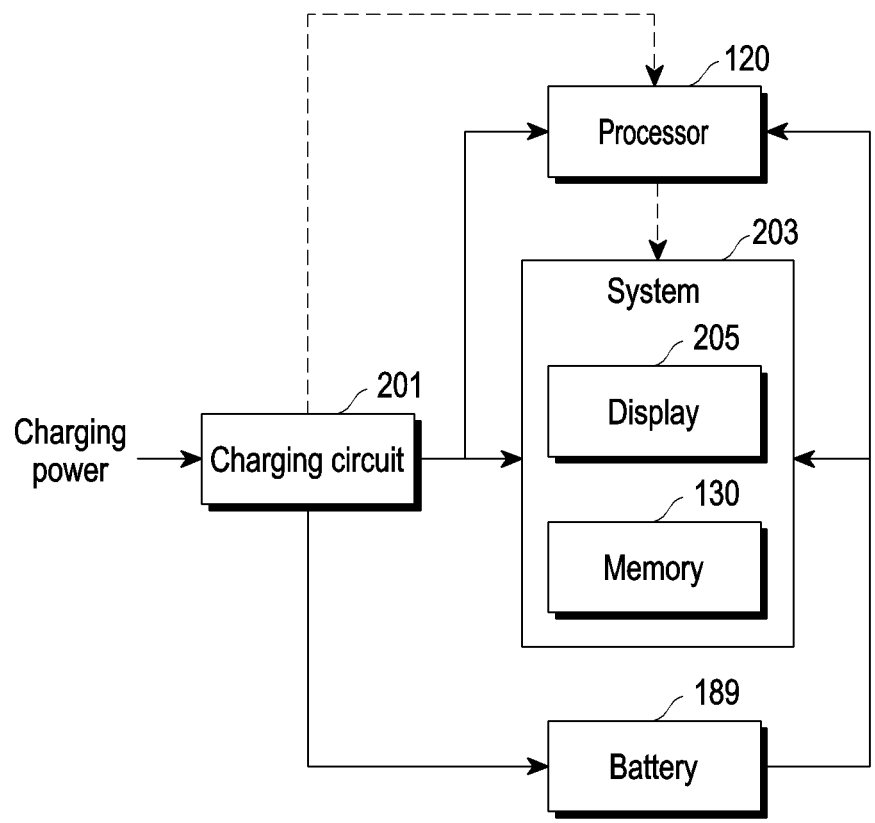
FIG. 2A is a block diagram illustrating elements of an electronic device according to an embodiment of the disclosure.
Figure 2B:
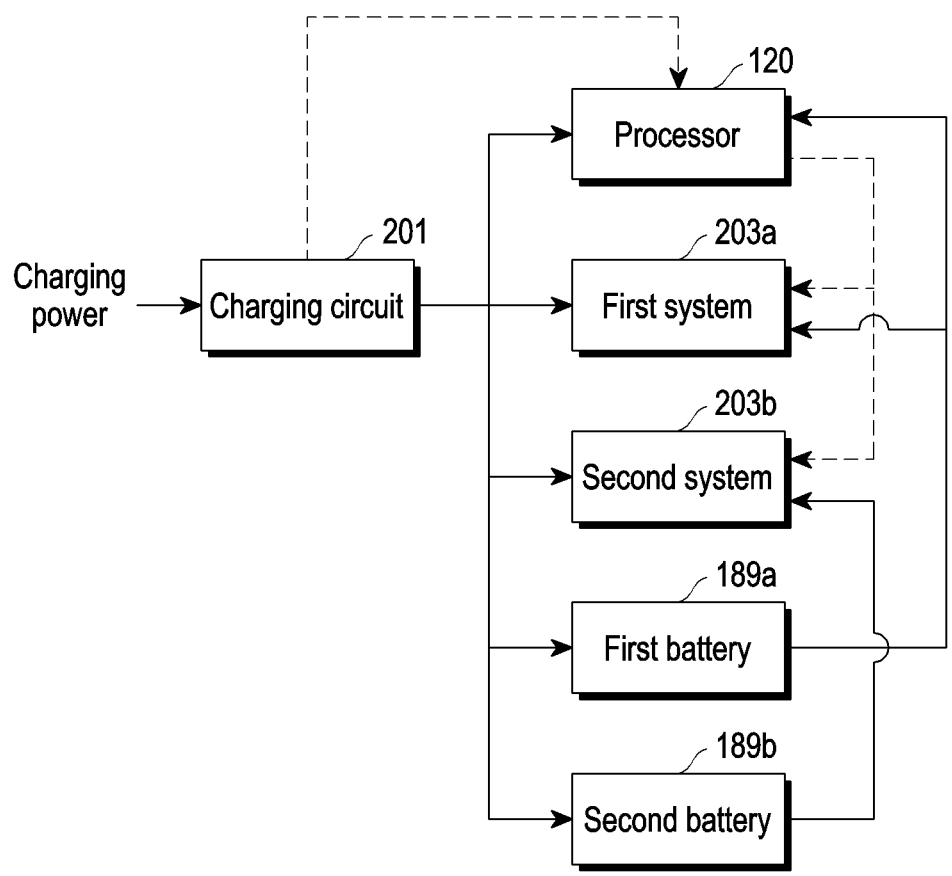
FIG. 2B is a block diagram illustrating elements of an electronic device according to an embodiment of the disclosure.

FIG. 2A is a block diagram illustrating elements of an electronic device according to an embodiment of the disclosure. FIG. 2B is a block diagram illustrating elements of an electronic device 101 according to an embodiment of the disclosure.

Referring to FIGS. 2A and 2B, according to various embodiments of the disclosure, the electronic device 101 may include a charging circuit 201 (e.g., the power management module 188 of FIG. 1), at least one battery (e.g., the battery 189, the first battery 189a, or the second battery 189b), at least one system (e.g., a system 203, a first system 203a, or a second system 203b), or the processor 120. According to various embodiments of the disclosure, the at least one system (e.g., the system 203, the first system 203a, or the second system 203b) may include a display 205, and/or the memory 130, and may further include various types of hardware elements. According to various embodiments of the disclosure, the system of the disclosure may be referred to as a load or various other terms. Hereinafter, the elements of the electronic device 101 are described with reference to FIG. 2A, and the case in which the battery 189 of the electronic device 101 includes a plurality of batteries (e.g., the first battery 189a and the second battery 189b) and the batteries provide power to different systems, respectively, is described with reference to FIG. 2B.

Referring to FIG. 2A, according to various embodiments of the disclosure, the charging circuit 201 may manage power of the electronic device 101.

According to various embodiments of the disclosure, the charging circuit 201 may be connected to a connection terminal (e.g., the connection terminal 178 of FIG. 1), and may receive power (hereinafter, charging power) from an external electronic device (e.g., the external electronic device 102 or the external electronic device 104 of FIG. 1) connected (or accessing) via the connection terminal 178. According to various embodiments of the disclosure, the charging circuit 201 may charge the battery 189 using the charging power provided from the external electronic device (e.g., the external electronic devices 102 and 104), or may provide (e.g., apply) power to at least one hardware element (e.g., the processor 120 or the system 203) for operating the at least one hardware element (e.g., the processor 120 or the system 203). For example, the charging circuit 201 may charge the battery 189 and may provide power to at least one hardware element (e.g., the processor 120 or the system 203) together (e.g., simultaneously), or may charge the battery 189 and secure the power of the battery 189, and may provide power to at least one hardware element (e.g., the processor 120 or the system 203). According to various embodiments of the disclosure, the electronic device 101 may further include a coil, a capacitor, and/or a rectifier (e.g., charging power) in order to receive power (e.g., charging power) in a wireless manner from an external electronic device (e.g., the external electronic devices 102 and 104) according to a resonance scheme, an induction scheme, and/or electromagnetic scheme. The charging circuit 201 may provide power to the battery 189 and/or at least one hardware element (e.g., the processor 120 or the system 203) using power (e.g., charging power) received in a wireless manner via a coil and/or a capacitor. Embodiments described in the disclosure may be equally applied to the case of performing wireless charging in a manner of receiving power wirelessly from an external electronic device (e.g., the external electronic devices 102 and 104) according to a resonance scheme, an induction scheme, and/or an electromagnetic scheme, in addition to the case of performing wired charging in a manner of receiving power via the connection terminal 178 from the external electronic device (e.g., the external electronic devices 102 and 104).

According to various embodiments of the disclosure, the charging circuit 201 may identify the state of the battery 189 (hereinafter referred to as a battery state). For example, the charging circuit 201 may identify a battery state when receiving charging power via a connection terminal (e.g., the connection terminal 178 of FIG. 1) (in other words, in a wired manner) from an external electronic device (e.g., the external electronic devices 102 and 104 of FIG. 1), or when receiving charging power in a wireless manner, during an off-state. For example, the battery state may include the current of the battery 189 (hereinafter referred to as a battery current), the voltage of the battery 189 (e.g., the voltage at both ends of the battery) (hereinafter referred to as a battery voltage), and/or the resistance of the battery 189 (hereinafter referred to as a battery resistance). According to various embodiments of the disclosure, the charging circuit 201 may identify at least one of a battery voltage, a battery current, or a battery resistance, simultaneously or separately (or individually). For example, the charging circuit 201 may identify a battery state by measuring at least one of a battery voltage, a battery current, or a battery resistance, or may identify a battery state by obtaining a sensing value (e.g., a voltage value, a current value, or a resistance value) measured by a sensor (e.g., the sensor module 176 of FIG. 1) connected to the outside (e.g., disposed in a path to which the charging circuit 201 and the battery 189 are connected or electrically connected to a path to which the charging circuit 201 and the battery 189 are connected).

According to various embodiments of the disclosure, the charging circuit 201 may control a current (hereinafter referred to as a charging current) provided to the battery 189 and/or a voltage (hereinafter a charging voltage) provided to the battery 189, based on the identified battery state. According to various embodiments of the disclosure, the charging circuit 201 may identify a battery voltage, and may compare the identified battery voltage with a predetermined threshold value. For example, the charging circuit 201 includes at least one element (e.g., a comparator), and may compare a battery voltage with a predetermined threshold voltage using the at least one element (e.g., the comparator). For example, the predetermined threshold value is a reference value for identifying whether the battery 189 is in an overdischarged state, and may be set to a value within a range measurable by the charging circuit 201 or a sensor (e.g., the sensor module 176 of FIG. 1). For example, the predetermined threshold value may be set to 1.2 V. As another example, the predetermined threshold value may be set to 1.0V or 1.5V, and is not limited to the above-described example.

According to various embodiments of the disclosure, the charging circuit 201 may stop charging of the battery 189 if the identified battery voltage is less than or equal to the predetermined threshold voltage. For example, the charging circuit 201 may prevent power received from the external electronic device (e.g., the external electronic devices 102 and 104) from being provided to the battery 189 if the identified battery voltage is less than or equal to the predetermined threshold voltage. For example, the charging circuit 201 may include a switching element (e.g., a field effect transistor (FET)) therein, and may change a switching element (e.g., FET) to an off-state based on the identification that the battery voltage is less than or equal to the predetermined threshold voltage, so that the power received from the external electronic device (e.g., the external electronic devices 102 and 104) may not be provided to the battery 189. The switching element included in the charging circuit 201 may be changed to an off-state based on the identification that the battery voltage is less than or equal to the predetermined threshold voltage, according to control by the processor 120. As another example, the electronic device 101 may include a switching element outside the charging circuit 201 (e.g., in a path to which the charging circuit 201 and the battery 189 are connected), and the charging circuit 201 or the processor 120 controls the switching element to be an off-state based on the identification that the battery voltage is less than or equal to the predetermined threshold voltage, so as to prevent the power received from the external electronic device (e.g., the external electronic devices 102 and 104) from being provided to the battery 189. If the switching element disposed outside the charging circuit 201 (e.g., disposed in a path to which the charging circuit 201 and the battery 189 are connected) is changed to an off-state, a physical charging wiring (e.g., a path from the charging circuit 201 to the battery 189) may be disconnected. As another example, the external electronic device (e.g., the external electronic devices 102 and 104) is requested to stop supplying power so that power is not transmitted from the external electronic device (e.g., the external electronic devices 102 and 104).

According to various embodiments of the disclosure, the charging circuit 201 may charge the battery 189 if the identified battery voltage exceeds the predetermined threshold voltage. For example, the charging circuit 201 may operate according to one of the various charging modes (e.g., a pre-charge mode, a trickle charge mode, or a fast charge mode) which corresponds to a battery voltage, so as to control a current and/or voltage provided to the battery 189 to correspond to the charging mode, and may charge the battery 189 based on the controlled current and/or voltage, which will be described with reference to the drawing described below. As another example, the charging circuit 201 may control a current and/or a voltage provided to the battery 189 based on a user input. For example, if a fast charge mode is selected based on a user input, the charging circuit 201 may control a current and/or a voltage based on settings corresponding to the fast charge mode.

According to various embodiments of the disclosure, the charging circuit 201 may provide a signal to the processor 120 based on the identified battery state. For example, the charging circuit 201 may provide a first signal to the processor 120 if the identified battery voltage is less than or equal to the predetermined threshold voltage. The first signal may be a signal indicating that a battery state is an overdischarged state. For example, if the charging circuit 201 provides a second signal to the processor 120 if the identified battery voltage exceeds the predetermined threshold voltage. The second signal may be a signal indicating that a battery state is not an overdischarged state.

According to various embodiments of the disclosure, the charging circuit 201 may be included in the PMIC, or may be disposed outside the PMIC and may be electrically connected to the PMIC.

According to various embodiments of the disclosure, it is apparent that the charging circuit 201 is referred to as a charging integrated circuit (IC), a charger, or a configuration that is capable of managing power of the electronic device 101.

According to various embodiments of the disclosure, the processor 120 may implement and/or control the overall operation of the electronic device 101. For example, the processor 120 may perform a predetermined operation of the electronic device 101, or may perform control so that another hardware element (e.g., the charging circuit 201 or the system 203) performs a designated operation.

According to various embodiments of the disclosure, the processor 120 may be a sub-processor (e.g., the sub-processor 123 of FIG. 1). For example, the processor 120 may be an image signal processor or a communication processor. As another example, the processor 120 may be a display driving integrated circuit (IC) included in the display 205. For example, the processor 120 may receive power supplied from the charging circuit 201 or the battery 189, and may be capable of working (e.g., operating) even with a voltage lower than the operating voltage of a main processor (e.g., the main processor 121 of FIG. 1). According to an embodiment of the disclosure, the processor 120 may be the main-processor 121. If the processor 120 is the main processor 121, only a part of the processor 120 may be activated and is capable of operating if a voltage less than or equal to the predetermined threshold voltage is provided.

According to various embodiments of the disclosure, the processor 120 may identify whether the battery 189 is in the overdischarged state. For example, if the first signal is provided from the charging circuit 201, the processor 120 may identify that the battery 189 is in the overdischarged state (or identify that a battery in the overdischarged state is present). As another example, the processor 120 may obtain information associated with a battery state (e.g., a battery current, a battery voltage, or a battery resistance) from the charging circuit 201, and if it is identified that the battery voltage is less than or equal to the predetermined threshold voltage based on the obtained information, the processor 120 may identify that the battery 189 is in the overdischarged state (or a battery in the overdischarged state is present).

According to various embodiments of the disclosure, if the first signal is provided from the charging circuit 201 or the battery 189 is identified as being in the overdischarged state, the processor 120 may perform a designated operation. For example, if the first signal is provided from the charging circuit 201 based on the identification that the battery voltage is less than or equal to the predetermined threshold voltage, the processor 120 may load (or read) at least one of a plurality of images stored in the memory 130, and may display the at least one loaded image on the display 205. The operation of loading and/or displaying an image by the processor 120 will be described with reference to a drawing provided below. According to various embodiments of the disclosure, a memory (e.g., the memory 130 of FIG. 1) from which the processor 120 loads an image may be included separately from the processor 120, may be included as a part of the processor 120, or may be included as a part of at least one hardware element (e.g., the display 205).

According to various embodiments of the disclosure, at least part of the operations of the processor 120 may be performed using power provided from the charging circuit 201. For example, if the battery 189 (or at least one of the plurality of batteries) of the electronic device 101 is in the overdischarged state, the processor 120 may work (or operate) using at least part of the power supplied from the charging circuit 201. As another example, if the electronic device 101 includes a plurality of batteries, and only some of the plurality of batteries are in the overdischarged state, the processor 120 may receive power supplied from a battery which is not in the overdischarged state, and may work (e.g., operate) using the supplied power.

According to various embodiments of the disclosure, the processor 120 may perform at least some of the operations performed by the charging circuit 201 described in the disclosure.

According to various embodiments of the disclosure, the battery 189 may supply power to at least one hardware element (e.g., the processor 120 or the system 203) of the electronic device 101.

According to various embodiments of the disclosure, the battery 189 may include two or more batteries. For example, the electronic device 101 may include two or more batteries in the form of a battery pack. According to various embodiments of the disclosure, a battery pack including two or more batteries may be referred to as a multi-battery or other names. According to various embodiments of the disclosure, the electronic device 101 may include two batteries, and one of a first battery or a second battery may be set as a main battery and the other is set as a sub-battery. According to various embodiments of the disclosure, the plurality of batteries may supply power to the system 203, and when power is supplied to the system 203, a main battery may be used preferentially than the sub-battery. According to various embodiments of the disclosure, if the electronic device 101 includes a plurality of batteries, the charging circuit 201 may identify the battery state of each of the plurality of batteries (e.g., at least one of a battery current, a battery voltage, or a battery resistance), and may compare each battery voltage with the predetermined threshold voltage. The charging circuit 201 may stop charging a battery (hereinafter referred to as a battery in the overdischarged state) corresponding to a battery voltage identified as being less than or equal to the predetermined threshold voltage. For example, the charging circuit 201 may not provide power received from the external electronic device (e.g., the external electronic devices 102 and 104) to the battery in the overdischarged state using a switching element disposed inside or outside the charging circuit 201. In this instance, a battery corresponding to a battery voltage identified as exceeding the predetermined threshold voltage (hereinafter referred to as a battery not in the overdischarged state) may be charged. According to various embodiments of the disclosure, the charging circuit 201 may stop charging of all of the plurality of batteries if it is identified that a battery in the overdischarged state is present. According to various embodiments of the disclosure, if the charging circuit 201 provides a first signal to the processor 120 if it is identified that a battery having a battery voltage less than or equal to the predetermined threshold voltage is present. For example, the first signal may include information representing (or indicating) a battery that is in the overdischarged state among a plurality of batteries. According to various embodiments of the disclosure, the charging circuit 201 may provide a second signal to the processor 120 if it is identified that a battery that is in the overdischarged state is not present. Accordingly, the processor 120 may identify a battery that is in the overdischarged state. For example, if the first signal is provided from the charging circuit 201, the processor 120 may identify that a battery that is in the overdischarged state is present. As another example, the processor 120 may identify a battery that is in the overdischarged state among the plurality of batteries, based on information included in the provided first signal (information indicating the battery that is in the overdischarged state). As another example, the processor 120 may obtain information associated with a battery state of each of the plurality of batteries (a battery current, a battery voltage, or a battery resistance) from the charging circuit 201, and may identify the existence of a battery that is in the overdischarged state and/or a battery that is in the overdischarged state among the plurality of batteries based on the obtained information. If the existence of the battery in the overdischarged state is identified or a battery in the overdischarged state is identified among the plurality of batteries, the processor 120 may perform a designated operation. For example, based on the identification that at least one of the plurality of batteries is in the overdischarged state, at least one image may be loaded from the memory 130 and the at least one loaded image may be displayed on the display 205. For example, the at least one image may include information representing (or indicating) at least one battery that is in the overdischarged state among the plurality of batteries.

According to various embodiments of the disclosure, the system 203 may include, for example, at least one of elements of the electronic device 101 of FIG. 1. Although FIG. 2A illustrates the display 205 and the memory 130 as an example of a hardware element included in the system 203, various hardware elements which are not illustrated in FIG. 1 may be included. According to various embodiments of the disclosure, the system 203 may operate by receiving power from the charging circuit 201 or the battery 189.

According to various embodiments of the disclosure, the display 205 may display at least one image. For example, the display 205 may display an image loaded from the memory 130 according to control by the processor 120. As another example, without control by the processor 120, the display 205 may receive a signal (e.g., a first signal) output from the charging circuit 201 based on identification that a battery voltage is less than or equal to the predetermined threshold voltage, and may display a designated image.

Referring to FIG. 2B, according to various embodiments of the disclosure, the electronic device 101 may include a plurality of batteries 189a and 189b. For example, the electronic device 101 may include two or more batteries in the form of a battery pack or in the form of being separated. Although it is illustrated that the electronic device 101 includes two batteries (e.g., the first battery 189a and the second battery 189b) in the drawing for ease of description, the electronic device 101 may include three or more batteries.

According to various embodiments of the disclosure, the first battery 189a may be configured to supply power to the processor 120 and the first system 203a, and the second battery 189b may be configured to supply power to the second system 203b. According to various embodiments of the disclosure, each of the display 205 and the memory 130 of FIG. 2A may be included in at least one of the first system 203a or the second system 203b. According to various embodiments of the disclosure, one of the first battery 189a and the second battery 189b may be configured to be a main battery, and the other one may be configured to be a sub-battery depending on the purpose of a battery. For example, the first battery 189a which is the main battery may be configured to supply power to at least one hardware element including the processor 120, and the second battery 189b which is the sub-battery may be configured to supply power to at least one other hardware element. According to various embodiments of the disclosure, the second battery 189b may be disposed outside the housing of the electronic device 101. For example, if the electronic device 101 includes an accessory device (e.g., an electronic pen) which is capable of being inserted into the housing or which is capable of being disposed in (e.g., detachable from) one side of the housing, the second battery 189b of the disclosure may be a battery embedded in the accessory device (e.g., an electronic pen) (e.g., included in the housing of the accessory device). In this instance, the second system 203b of the disclosure may be at least one hardware element included in an accessory device (e.g., an electronic pen).

According to various embodiments of the disclosure, the charging circuit 201 may identify the battery state of each of the first battery 189a and the second battery 189b. For example, the battery state may include at least one of a battery current, a battery voltage, or a battery resistance of each of the first battery 189a and the second battery 189b. According to various embodiments of the disclosure, the charging circuit 201 may compare the battery voltage of each of the first battery 189a and the second battery 189b with the predetermined threshold voltage. According to various embodiments of the disclosure, the charging circuit 201 may stop charging a battery (hereinafter referred to as a battery in the overdischarged state) corresponding to a battery voltage identified as being less than or equal to the predetermined threshold voltage. For example, the charging circuit 201 may not provide power received from the external electronic device (e.g., the external electronic devices 102 and 104) to the battery in the overdischarged state using a switching element disposed inside or outside the charging circuit 201. In this instance, a battery corresponding to a battery voltage identified as exceeding the predetermined threshold voltage (hereinafter referred to as a battery not in the overdischarged state) may be charged. According to various embodiments of the disclosure, if it is identified that a battery in the overdischarged state is present, the charging circuit 201 may stop charging of the first battery 189a and the second battery 189b. According to various embodiments of the disclosure, if it is identified that a battery having a battery voltage less than or equal to the predetermined threshold voltage is present, the charging circuit 201 may provide a first signal to the processor 120. For example, the first signal may include information representing (or indicating) a battery that is in the overdischarged state between the first battery 189a and the second battery 189b. According to various embodiments of the disclosure, the charging circuit 201 may provide a second signal to the processor 120 if it is identified that a battery that is in the overdischarged state is not present.

According to various embodiments of the disclosure, the processor 120 may identify a battery that is in the overdischarged state. For example, if the first signal is provided from the charging circuit 201, the processor 120 may identify that a battery in the overdischarged state is present. As another example, the processor 120 may identify a battery that is in the overdischarged state between the first battery 189a and the second battery 189b, based on information included in the provided first signal (information indicating a battery that is in the overdischarged state). As another example, the processor 120 may obtain information associated with the battery state of each of the first battery 189a and the second battery 189b (e.g., a battery current, a battery voltage, or a battery resistance) from the charging circuit 201, and based on the obtained information, may identify the existence of a battery that is in the overdischarged state and/or a battery that is in the overdischarged state between the first battery 189a and the second battery 189b.

According to various embodiments of the disclosure, if it is identified that a battery that is in the overdischarged state is present or a battery that is in the overdischarged state is identified between the first battery 189a and the second battery 189b, the processor 120 may perform a designated operation. For example, based on the identification that at least one of the first battery 189a or the second battery 189b is in the overdischarged state, at least one image may be loaded from the memory 130 and the at least one loaded image may be displayed on the display 205. For example, the at least one image may include information representing (or indicating) at least one battery that is in the overdischarged state between the first battery 189a and the second battery 189b.

According to various embodiments of the disclosure, at least some of the operations of the processor 120 may be performed using power supplied from the charging circuit 201. For example, if the first battery 189a of the electronic device 101 or both the first battery 189a and the second battery 189b are in the overdischarged state, the processor 120 may work (or operate) using at least part of the power supplied from the charging circuit 201. As another example, if only the second battery 189b is in the overdischarged state between the first battery 189a and the second battery 189b (i.e., if the first battery 189a that supplies power to the processor 120 is not in the overdischarged state), the processor 120 may receive power from the first battery 189a, and may work (e.g., operate) using the supplied power. Unlike the drawing, the second battery 189b, in addition to the first battery 189a, may be connected to the processor 120 so as to provide power to the processor 120, and if only one of the first battery 189a and the second battery 189b is in the overdischarged state, the processor 120 may operate by receiving power supplied from a battery that is not in the overdischarged state.

Figure 3:
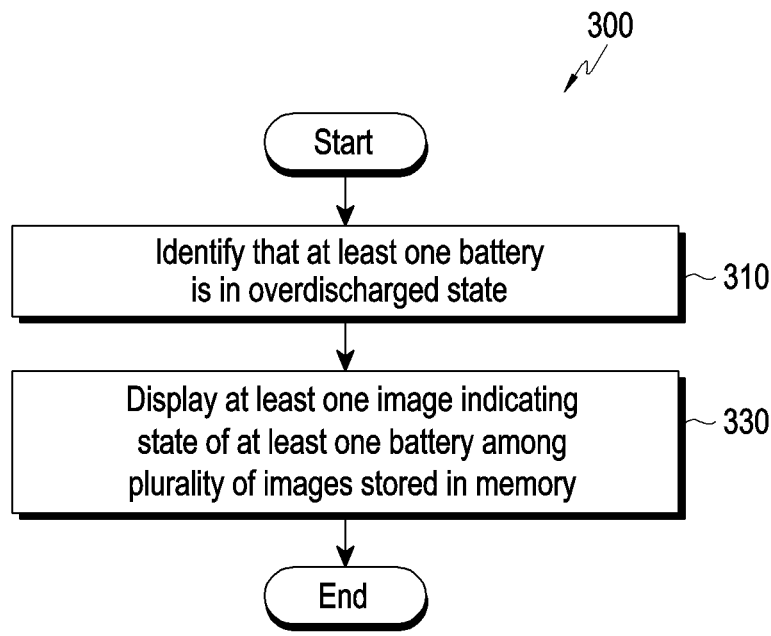
FIG. 3 is a flowchart illustrating an operation of displaying an image by an electronic device when detecting an overdischarged state of a battery according to an embodiment of the disclosure.

FIG. 3 is a flowchart 300 illustrating an operation of displaying an image by an electronic device (e.g., the electronic device 101 of FIG. 1) when detecting an overdischarged state of a battery according to an embodiment of the disclosure.

Referring to FIG. 3, according to various embodiments of the disclosure, the electronic device 101 may identify that at least one battery (e.g., the battery 189) is in the overdischarged state at operation 310. For example, the electronic device 101 may identify that at least one battery (e.g., the battery 189) is in the overdischarged state based on a first signal provided from a charging circuit (e.g., the charging circuit 201 of FIG. 2A or FIG. 2B) or information associated with a battery state obtained from the charging circuit 201. According to various embodiments of the disclosure, a processor (e.g., the processor 120 of FIG. 1) of the electronic device 101 may operate using power supplied from the charging circuit 201, and may proceed with operation 310 and subsequent operations. According to various embodiments of the disclosure, if the electronic device 101 includes a plurality of batteries, and a battery (e.g., the first battery 189a of FIG. 2B) configured to supply power to the processor 120 is not in the overdischarged state, the electronic device 101 may operate by receiving power from the battery (e.g., the first battery 189a of FIG. 2B).

According to various embodiments of the disclosure, at operation 330, the electronic device 101 may display at least one image indicating the state of at least one battery among a plurality of images stored in a memory (e.g., the memory 130 of FIG. 1). According to various embodiments of the disclosure, if it is identified that the battery 189 in the overdischarged state is present, the electronic device 101 may display at least one image indicating the state of at least one battery. For example, the at least one image may include at least one of information representing (or indicating) a battery that is in the overdischarged state or information indicating the existence of a battery in the overdischarged state. For example, the at least one image may include information associated with an action that a user is required to perform (e.g., prevent charging and/or request repairing/changing of a battery) with respect to the electronic device 101. According to various embodiments of the disclosure, the at least one image may include at least one image loaded among the plurality of images stored in the memory 130.

Figure 4:
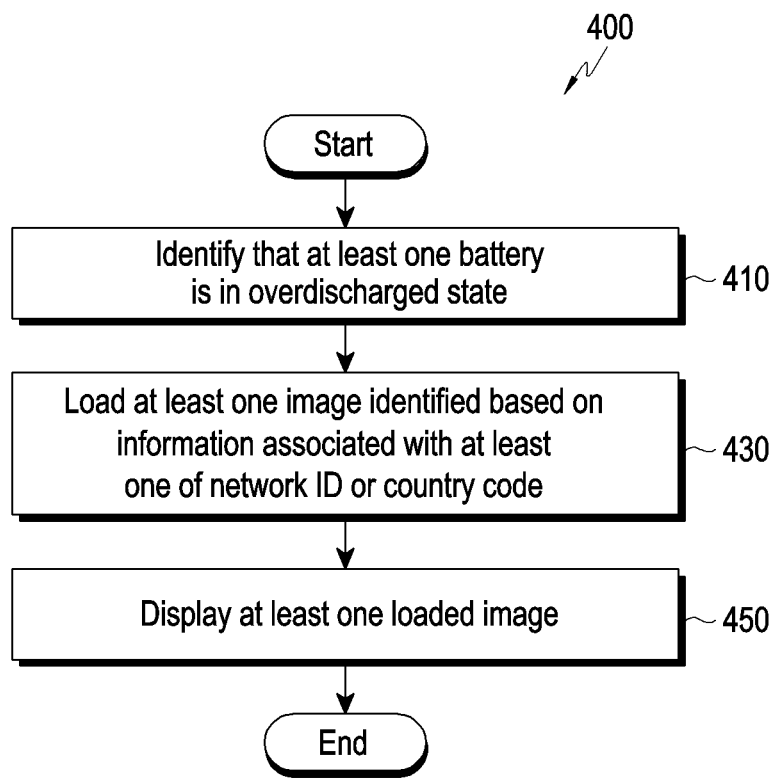
FIG. 4 is a flowchart illustrating an operation of displaying an image by an electronic device when detecting an overdischarged state of a battery according to an embodiment of the disclosure.

FIG. 4 is a flowchart 400 illustrating an operation of displaying an image by an electronic device when detecting an overdischarged state of a battery according to an embodiment of the disclosure.

Referring to FIG. 4, according to various embodiments of the disclosure, a processor (e.g., the processor 120 of FIG. 1) of the electronic device 101 may operate using power supplied from the charging circuit 201, and may proceed with subsequent operations. According to various embodiments of the disclosure, if the electronic device 101 includes a plurality of batteries, and a battery (e.g., the first battery 189a of FIG. 2B) configured to supply power to the processor 120 is not in the overdischarged state, the electronic device 101 may operate by receiving power from the battery (e.g., the first battery 189a of FIG. 2B).

According to various embodiments of the disclosure, at operation 410, the electronic device 101 may identify that at least one battery (e.g., the battery 189) is in the overdischarged state.

According to various embodiments of the disclosure, at operation 430, the electronic device 101 may load at least one image identified based on information associated with at least one of a network identification (ID) or a country code. According to various embodiments of the disclosure, in a memory (e.g., the memory 130 of FIG. 1), images including text (e.g., a phone number or an address) or a picture (e.g., a logo) which corresponds to each of various countries, communication operators, or manufacturers may be stored in advance. According to various embodiments of the disclosure, based on information associated with at least one of a network ID or a country code, at least one image among the plurality of images stored in the memory 130 may be loaded in the memory 130. According to various embodiments of the disclosure, information associated with at least one of a network ID or a country code may be information obtained while the electronic device 101 is in an on-state (e.g., the battery of the electronic device 101 is not in the overdischarged state). According to various embodiments of the disclosure, the network ID may be information indicating a communication operator that provides the communication service of a network (e.g., the second network 199 of FIG. 1) to the electronic device 101, and may include, for example, a public land mobile network (PLMN). According to various embodiments of the disclosure, the country code may include, for example, an international organization for standardization (ISO) 3166-1. According to various embodiments of the disclosure, the identified information may include information associated with a business operator (hereinafter referred to as a manufacturer) that manufactures the electronic device 101. According to various embodiments of the disclosure, the at least one loaded image may be determined based on information associated with at least one of a network ID or a country code. For example, while being in an on-state, the electronic device 101 may determine at least one image to be displayed when the battery 189 is in the overdischarged state in advance based on information associated with at least one of a network ID or a country code, and may load and display the at least one predetermined image when the battery 189 is in the overdischarged state. As another example, the electronic device 101 may identify information associated with at least one of a network ID or a country code when the battery 189 is in the overdischarged state, and may determine and display at least one image based on the identified information. According to various embodiments of the disclosure, the at least image which is loaded and/or displayed may include an image (e.g., a logo) or text in the language of a country corresponding a country code and/or a network ID. For example, if the country code corresponds to a country (e.g., Japan) for which a communication operator is in charge of repairing the electronic device 101 or if the network ID corresponds to the communication operator of a country (e.g., Japan) for which the communication operator is in charge of repairing the electronic device 101, at least one loaded and/or displayed image may include information (e.g., a logo, a phone number, or an address) associated with the after-service (A/S) center of the communication operator. For example, if the country code corresponds to a country for which a manufacturer is in charge of repairing the electronic device 101 or if the network ID corresponds to the communication operator of a country for which the manufacturer is in charge of repairing the electronic device 101, at least one loaded and/or displayed image may include information (e.g., a logo, a phone number, or an address) associated with the after-service (A/S) center of the manufacturer.

Figure 5:
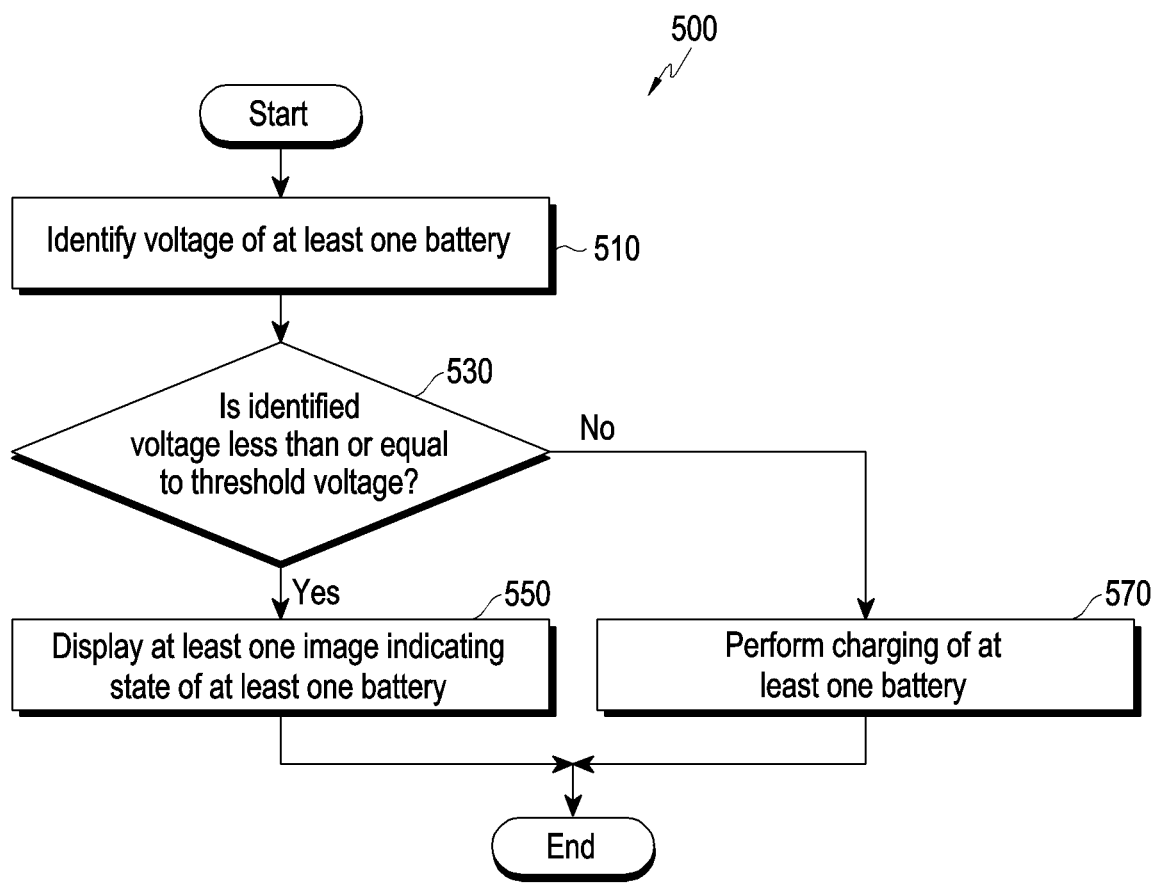
FIG. 5 is a flowchart illustrating an operation of controlling charging or displaying an image by an electronic device depending on whether an overdischarged state is detected according to an embodiment of the disclosure.

FIG. 5 is a flowchart 500 illustrating an operation of controlling charging or displaying an image by an electronic device depending on whether an overdischarged state is detected, according to an embodiment of the disclosure.

Referring to FIG. 5, according to various embodiments of the disclosure, a processor (e.g., the processor 120 of FIG. 1) of the electronic device 101 may operate using power supplied from the charging circuit 201, and may proceed with subsequent operations. According to various embodiments of the disclosure, if the electronic device 101 includes a plurality of batteries, and a battery (e.g., the first battery 189a of FIG. 2B) configured to supply power to the processor 120 is not in the overdischarged state, the electronic device 101 may operate by receiving power from the battery (e.g., the first battery 189a of FIG. 2B).

According to various embodiments of the disclosure, the electronic device 101 may identify the voltage of at least one battery at operation 510.

According to various embodiments of the disclosure, the electronic device 101 may identify whether the identified voltage is less than or equal to a threshold voltage at operation 530. For example, the threshold voltage may be a predetermined value for identifying whether the battery 189 is in the overdischarged state.

According to various embodiments of the disclosure, if it is identified that the identified voltage is less than or equal to the threshold voltage, the electronic device 101 may display at least one image indicating the state of at least one battery 189 at operation 550. For example, the at least one image may include at least one piece of information among information indicating a battery in the overdischarged state, information indicating the existence of a battery in the overdischarged state, or information associated with an action that a user needs to perform (e.g., prevent charging and/or request repairing/changing of a battery) with respect to the electronic device 101. For example, the at least one image may include at least one image determined based on information associated with at least one of a network ID or a country code. According to various embodiments of the disclosure, if the identified voltage is identified as being less than or equal to the threshold voltage (e.g., if the existence of the battery 189 in the overdischarged state is identified), the electronic device 101 may stop charging all or some of at least one battery 189. For example, after stopping charging all or some of the at least one battery 189, the electronic device 101 may display at least one image. For example, the electronic device 101 may stop charging all or some of the at least one battery 189, at the same time at which the electronic device 101 displays at least one image.

According to various embodiments of the disclosure, if it is identified that the identified voltage exceeds the threshold voltage, the electronic device 101 may perform charging of the at least one battery 189 at operation 570.

Figure 6A:
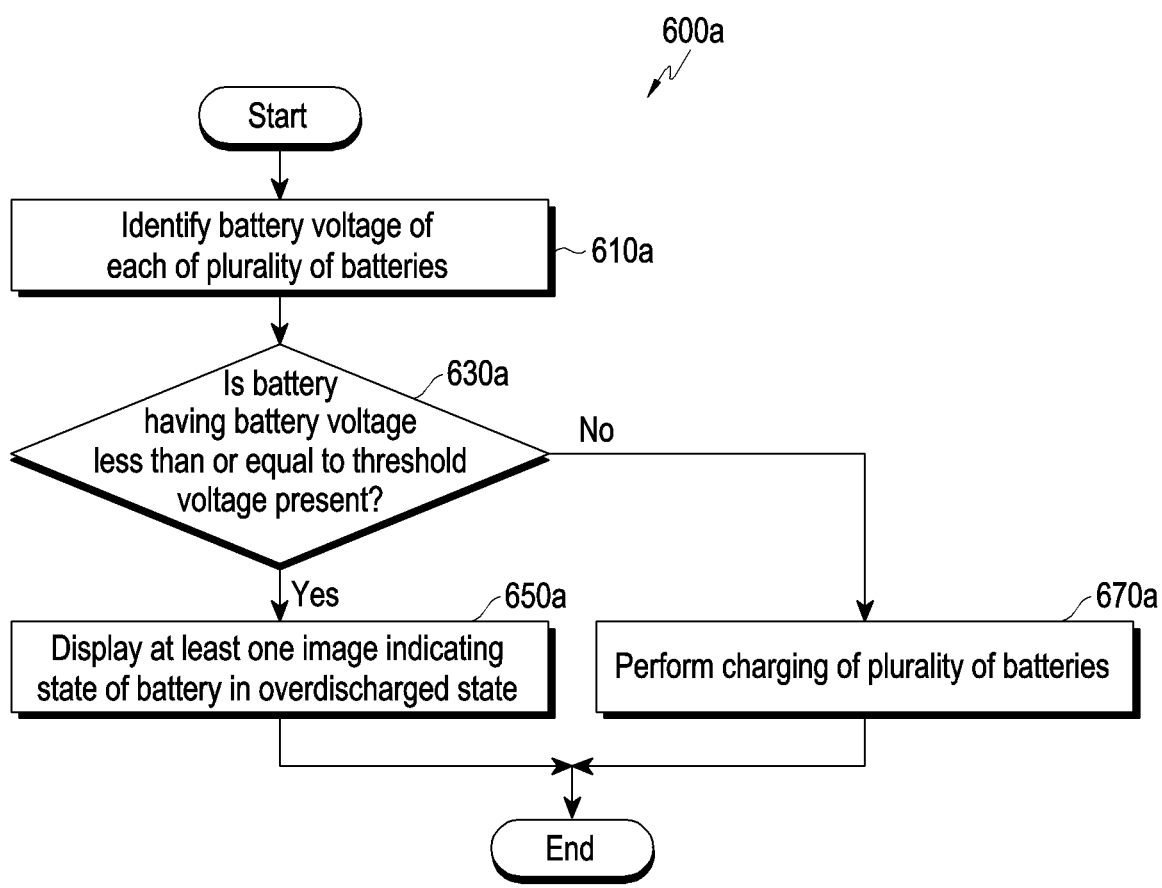
FIG. 6A is a flowchart illustrating an operation of controlling charging or displaying an image by an electronic device depending on whether a battery in an overdischarged state is present if a plurality of batteries are included according to an embodiment of the disclosure.

FIG. 6A is a flowchart 600a illustrating an operation of controlling charging or displaying an image depending on the existence of a battery in an overdischarged state if an electronic device includes a plurality of batteries according to an embodiment of the disclosure.

Referring to FIG. 6A, according to various embodiments of the disclosure, a processor (e.g., the processor 120 of FIG. 1) of the electronic device 101 may operate using power supplied from the charging circuit 201, and may proceed with subsequent operations. According to various embodiments of the disclosure, if the electronic device 101 includes a plurality of batteries, and a battery (e.g., the first battery 189a of FIG. 2B) configured to supply power to the processor 120 is not in the overdischarged state, the electronic device 101 may operate by receiving power from the battery (e.g., the first battery 189a of FIG. 2B).

According to various embodiments of the disclosure, the electronic device 101 may identify the battery voltage of each of a plurality of batteries (e.g., the first battery 189a and the second battery 189b) at operation 610a.

According to various embodiments of the disclosure, the electronic device 101 may identify whether a battery having a battery voltage less than or equal to a threshold voltage is present at operation 630a. According to various embodiments of the disclosure, a battery having a battery voltage less than or equal to the threshold voltage may be identified as being a battery in the overdischarged state.

According to various embodiments of the disclosure, if it is identified that a battery having a battery voltage less than or equal to the threshold voltage is present, the electronic device 101 may display at least one image indicating the state of the battery in the overdischarged state at operation 650a. For example, the at least one image may include at least one piece of information among information representing (or indicating) a battery in the overdischarged state, information indicating the existence of a battery in the overdischarged state, or information associated with an action that a user needs to perform (e.g., prevent charging and/or request repairing/changing of a battery) with respect to the electronic device 101. For example, the at least one image may include at least one image determined based on information associated with at least one of a network ID or a country code.

According to various embodiments of the disclosure, if it is identified that a battery having a battery voltage less than or equal to the threshold voltage is not present, the electronic device 101 may perform charging of a plurality of batteries at operation 670a.

Figure 6B:
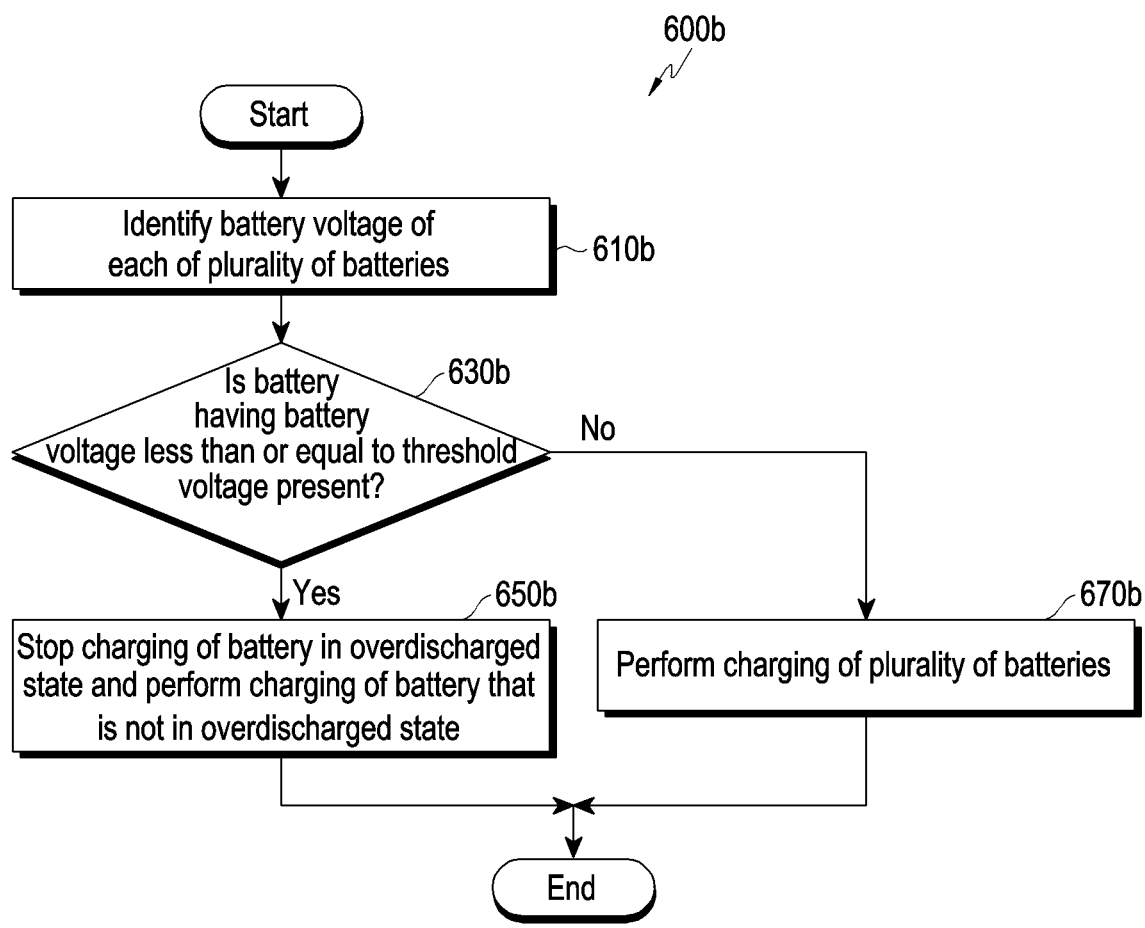
FIG. 6B is a flowchart illustrating an operation of controlling charging or displaying an image by an electronic device depending on whether a battery in an overdischarged state is present if a plurality of batteries are included according to an embodiment of the disclosure.

FIG. 6B is a flowchart 600b illustrating an operation of controlling charging or displaying an image depending on an existence of a battery in an overdischarged state if an electronic device includes a plurality of batteries according to an embodiment of the disclosure.

Referring to FIG. 6B, according to various embodiments of the disclosure, a processor (e.g., the processor 120 of FIG. 1) of the electronic device 101 may operate using power supplied from the charging circuit 201, and may proceed with subsequent operations. According to various embodiments of the disclosure, if the electronic device 101 includes a plurality of batteries, and a battery (e.g., the first battery 189a of FIG. 2B) configured to supply power to the processor 120 is not in the overdischarged state, the electronic device 101 may operate by receiving power from the battery (e.g., the first battery 189a of FIG. 2B).

According to various embodiments of the disclosure, the electronic device 101 may identify the battery voltage of each of the plurality of batteries (e.g., the first battery 189a and the second battery 189b) at operation 610b.

According to various embodiments of the disclosure, the electronic device 101 may identify whether a battery having a battery voltage less than or equal to a threshold voltage is present at operation 630b. According to various embodiments of the disclosure, a battery having a battery voltage less than or equal to the threshold voltage may be identified as being a battery in the overdischarged state.

According to various embodiments of the disclosure, if it is identified that a battery having a battery voltage less than or equal to the threshold voltage is present, the electronic device 101 may stop charging a battery in the overdischarged state, and may charge a battery that is not in the overdischarged state at operation 650b. For example, referring to FIG. 2B together, if it is identified that the first battery 189a is in the overdischarged state and the second battery 189b is not in the overdischarged state, the electronic device 101 may prevent providing power received from an external electronic device (e.g., the external electronic devices 102 and 104 of FIG. 1) to the first battery 189a and may provide power to the second battery 189*b*. In other words, the electronic device 101 may stop charging only for a battery in the overdischarged state among the plurality of batteries. According to various embodiments of the disclosure, the electronic device 101 may display at least one image after or at the same time at which the electronic device 101 stops charging a battery in the overdischarged state among the plurality of batteries. For example, after stopping charging all or some of the at least one battery 189, the electronic device 101 may display at least one image. For example, the at least one image may include at least one piece of information among information representing (or indicating) a battery in the overdischarged state, information indicating the existence of a battery in the overdischarged state, or information associated with an action that a user is required to perform (e.g., prevent charging and/or request repairing/changing of a battery) with respect to the electronic device 101. For example, the at least one image may include at least one image determined based on information associated with at least one of a network ID or a country code.

According to various embodiments of the disclosure, if it is identified that a battery having a battery voltage less than or equal to the threshold voltage is not present, the electronic device 101 may perform charging of a plurality of batteries at operation 670*b*.

Figure 7:
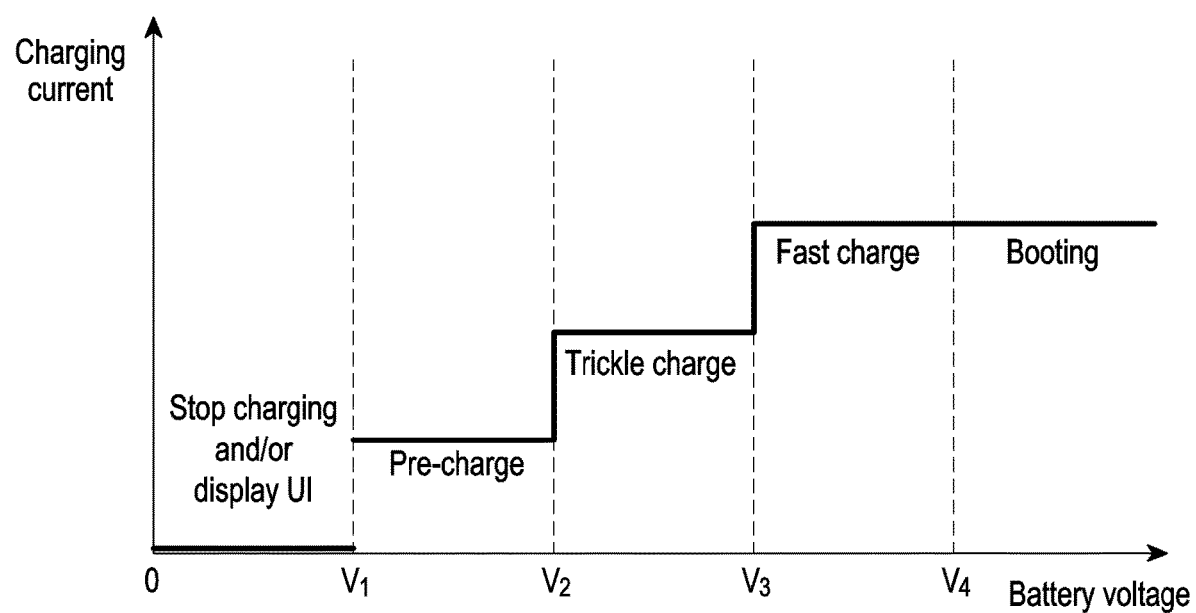
FIG. 7 is a diagram illustrating charging modes of an electronic device according to an embodiment of the disclosure.

FIG. 7 is a diagram illustrating charging modes of an electronic device according to an embodiment of the disclosure.

Referring to FIG. 7, the charging modes of the electronic device 101 may include at least one of, for example, a mode for stopping of charging and/or displaying a user interface (UI) (e.g., at least one image), a pre-charge mode, a trickle charge mode, or a fast charge mode. $V_1$ of FIG. 7 is a threshold value (e.g., 1.0 V, 1.2 V, or 1.5 V) for identifying whether a battery is in the overdischarged state, which is described in the disclosure. If the voltage of a battery (e.g., at least one of a plurality of batteries) included in the electronic device 101 is less than or equal to $V_1$, the electronic device 101 may perform the above-described operation of stopping charging and/or displaying a user interface (e.g., at least one image). $V_2$, $V_3$, and $V_4$ of FIG. 7 may be, for example, 2.5V, 3.1V, and 3.5V, and those are not limited to the above-described example.

According to various embodiments of the disclosure, a current and/or voltage applied to a battery (e.g., the battery 189 of FIG. 1) may be controlled by a charging circuit (e.g., the charging circuit 201 of FIG. 2A or FIG. 2B) according to the battery voltage of the electronic device 101. For example, in an off-state, if power is received from an external electronic device (e.g., the external electronic devices 102 and 104 of FIG. 1), the electronic device 101 may identify a battery voltage, and may control a current and/or voltage provided to the battery 189 depending on a mode corresponding to the identified battery voltage. For example, when power is received from the external electronic device (e.g., the external electronic devices 102 and 104 of FIG. 1), if the battery voltage exceeds $V_1$ and less than or equal to $V_2$, a voltage of a first magnitude (e.g., 5V) and a current of a second magnitude (e.g., 55 mA) may be provided to the battery 189. For example, when power is received from the external electronic device (e.g., the external electronic devices 102 and 104 of FIG. 1), if the battery voltage exceeds $V_2$ and less than or equal to $V_3$, a voltage of a third magnitude (e.g., 5V) and a current of a fourth magnitude (e.g., 450 mA) may be provided to the battery 189. When power is received from the external electronic device (e.g., the external electronic devices 102 and 104 of FIG. 1), if the battery voltage exceeds $V_3$ and less than or equal to $V_4$, the charging circuit 201 may provide a voltage exceeding the third magnitude and/or a current exceeding the fourth magnitude to the battery 189. According to various embodiments of the disclosure, as charging the battery 189 proceeds, the battery voltage may be gradually increased. According to various embodiments of the disclosure, if a voltage section which the battery voltage falls in is changed as charging battery 189 proceeds, the charging circuit 201 may provide, to the battery 189, a voltage and/or a current corresponding to the voltage section which the battery voltage falls in. According to various embodiments of the disclosure, if the battery voltage exceeds $V_4$ as charging the battery 189 proceeds, the electronic device 101 may be changed to an on-state (e.g., booted up).

Subsequently, if the battery voltage exceeds $V_4$, the electronic device 101 may become a state capable of being booted up (e.g., a state capable of being changed to an on-state).

According to various embodiments of the disclosure, the electronic device 101 may include information associated with the charging mode of the electronic device 101 in at least one image indicating the state of a battery which is in the overdischarged state, and may display the same.

According to various embodiments of the disclosure, if the electronic device 101 includes a plurality of batteries, the electronic device 101 may determine a charging mode corresponding to each battery based on the battery state of each of the plurality of batteries. For example, referring to FIG. 2B, if the battery voltage of the first battery 189*a* exceeds $V_1$ and less than or equal to $V_2$, and the battery voltage of the second battery 189*a* exceeds $V_2$ and less than or equal to $V_3$, the charging circuit 201 may provide a voltage of a first magnitude (e.g., 5V) and a current of a second magnitude (e.g., 55 mA) to the first battery 189*a*, and may provide a voltage of a third magnitude (e.g., 5V) and a current of a fourth magnitude (e.g., 450 mA) to the second battery 189*b*.

Figure 8A:
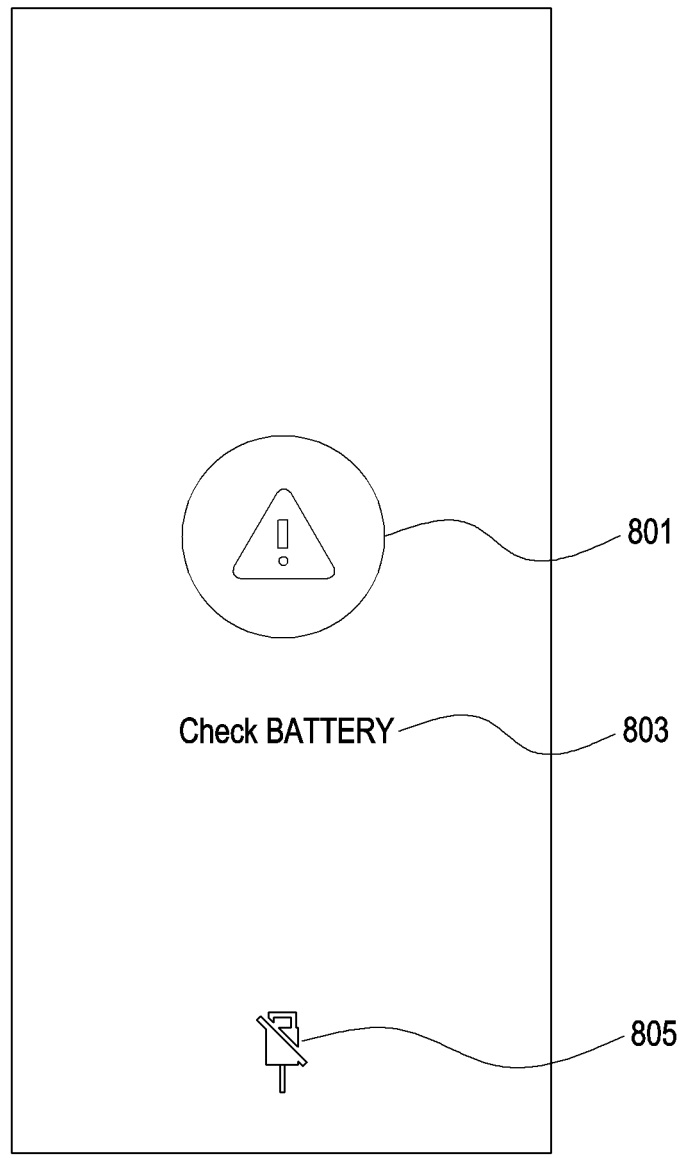
FIG. 8A is a diagram illustrating a screen displayed on a display when at least one battery is in an overdischarged state according to an embodiment of the disclosure.
Figure 8B:
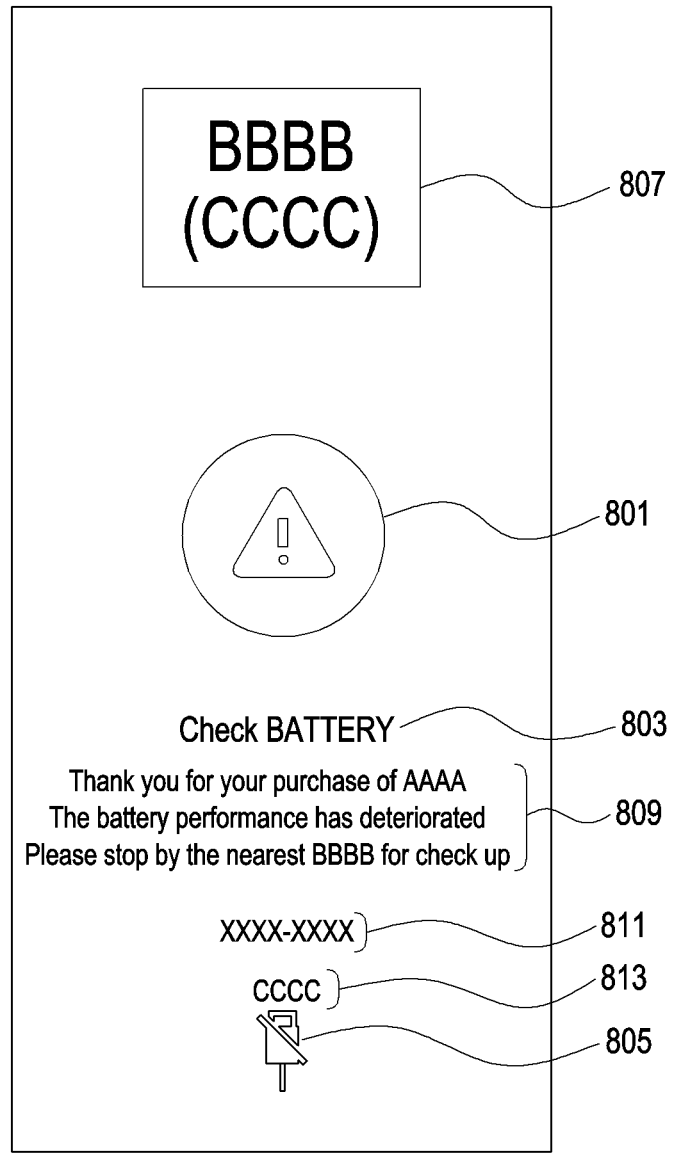
FIG. 8B is a diagram illustrating a screen displayed on a display when at least one battery is in an overdischarged state according to an embodiment of the disclosure.
Figure 8C:
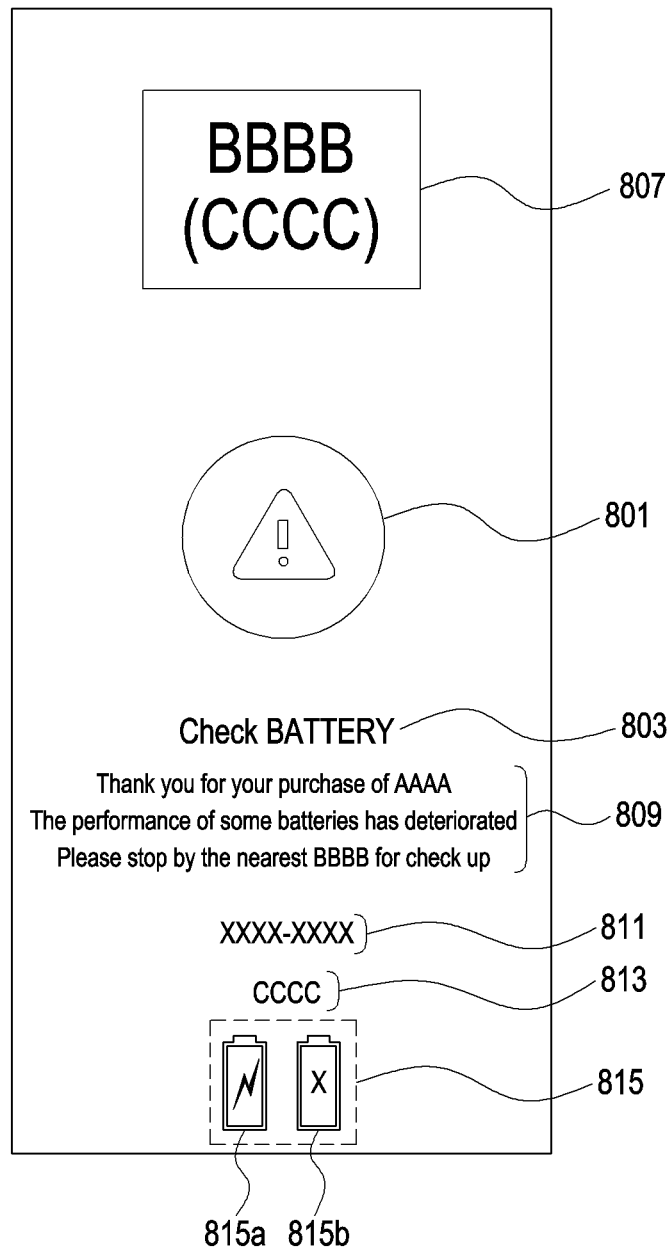
FIG. 8C is a diagram illustrating a screen displayed on a display when at least one battery is in an overdischarged state according to an embodiment of the disclosure.

FIG. 8A is a diagram illustrating a screen displayed on a display when at least one battery is in the overdischarged state according to an embodiment of the disclosure. FIG. 8B is a diagram illustrating a screen displayed on a display when at least one battery is in an overdischarged state according to an embodiment of the disclosure. FIG. 8C is a diagram illustrating a screen displayed on a display when at least one battery is in the overdischarged state according to an embodiment of the disclosure.

Referring to FIG. 8A, according to various embodiments of the disclosure, if the at least one battery 189 is in the overdischarged state, a screen including at least one object (e.g., an image or text) may be displayed on the display 205. According to various embodiments of the disclosure, a first object 801 may indicate that a battery in the overdischarged state is present. According to various embodiments of the disclosure, a second object 803 may indicate an action that a user is required to perform (e.g., check a battery and/or repair/change a battery) ("check battery") with respect to the electronic device 101. According to various embodiments of the disclosure, a second object 803 may indicate an action that a clerk in an A/S center who checks and/or repairs the electronic device 101 is required to perform (e.g., check a battery and/or repair/change a battery) ("check battery") with respect to the electronic device 101. According to various embodiments of the disclosure, a third object 805 may indicate an action that a user is required to perform (e.g., prevent charging) with respect to the electronic device 101 or may indicate that charging of a battery of the electronic device 101 is stop (e.g., charging is not allowed). According to various embodiments of the disclosure, the first object 801 to third object 805 may be displayed as an image or text in the language of a country corresponding to a country code and/or network ID. For example, if the country of the electronic device 101 is Japan, "check battery" of the second object 803 may be written in Japanese. According to various embodiments of the disclosure, at least one of the above-described first object 801 to the third object 805 may be omitted (e.g., may not be displayed).

Referring to FIG. 8B, according to various embodiments of the disclosure, if at least one battery 189 is in the overdischarged state, the screen displayed on the display 205 may further include at least one of a fourth object 807, a fifth object 809, a sixth object 811, or a seventh object 813. According to various embodiments of the disclosure, the fourth object 807 may include at least one among information associated with an electronic device (e.g., a model name or model number of the electronic device) ("AAAA"), information associated with a communication operator (e.g., a communication operator name) ("BBBB"), or information associated with a manufacturer (e.g., a manufacturer name) ("CCCC"). According to various embodiments of the disclosure, information associated with a communication operator ("BBBB") may be identified based on, for example, a network ID (e.g., PLMN). According to various embodiments of the disclosure, information associated with a manufacturer ("CCCC") may be identified based on at least one of information input by a manufacturer or the model name of the electronic device 101. According to various embodiments of the disclosure, a fifth object 809 may include at least one of information indicating the existence of a battery in the overdischarged state ("The battery performance has deteriorated") or an action that a user is required to perform ("Please stop by the nearest BBBB for a checkup) with respect to the electronic device 101. According to various embodiments of the disclosure, if the manufacturer of the electronic device 101 is in charge of repairing the electronic device 101, indication read as "Please stop by the nearest CCCC for a checkup" may be displayed. According to various embodiments of the disclosure, the sixth object 811 may include information associated with an A/S center that is in charge of repairing the electronic device 101 (e.g., the phone number of the A/S center) ("XXXX-XXXX"). According to various embodiments of the disclosure, the seventh object 813 may indicate information associated with the manufacturer of the electronic device 101 (e.g., a manufacturer name) ("CCCC"). According to various embodiments of the disclosure, the first object 801 to seventh object 813 may be displayed as an image or text in the language of a country corresponding to a country code and/or network ID. According to various embodiments of the disclosure, at least one of the above-described first object 801 to the seventh object 813 may be omitted (e.g., may not be displayed).

Referring to FIG. 8C, according to various embodiments of the disclosure, the fifth object 809 may include information indicating that some of a plurality of batteries (e.g., the first battery 189*a* and the second battery 189*b* of FIG. 2B) included in the electronic device 101 are in the overdischarged state ("The performance of some batteries has deteriorated"). According to various embodiments of the disclosure, if the at least one battery 189 is in the overdischarged state, a screen displayed on the display 205 may further include an eighth object 815. According to various embodiments of the disclosure, the eighth object 815 may indicate the charging state (e.g., charging or stop charging) of each of the plurality of batteries (e.g., the first battery 189*a* and the second battery 189*b*). For example, a left object 815*a* and a right object 815*b* correspond to the first battery 189*a* and the second battery 189*b*, respectively, and the left object 815*a* indicates that the first battery 189*a* is being charged (e.g., is capable of being charged), and the right object 815*b* indicates that charging of the second battery 189*b* is stopped (e.g., charging is not allowed). According to various embodiments of the disclosure, from the left object 815*a* and the right object 815*b*, it is identified that the electronic device 101 includes two batteries, and one of the batteries is not in the overdischarged and the other battery is in the overdischarged state. A user of the electronic device 101 or a clerk of an A/S center may identify the above-described information from the left object 815*a* and the right object 815*b*, and may perform an appropriate action (e.g., check or repair/change the second battery 189*b* corresponding to the right object 815*b*). According to various embodiments of the disclosure, the first object 801 to eighth object 815 may be displayed as an image or text in the language of a country corresponding to a country code and/or network ID. According to various embodiments of the disclosure, at least one of the above-described first object 801 to the eighth object 815 may be omitted (e.g., may not be displayed).

According to various embodiments of the disclosure, an electronic device may include at least one battery, a charging circuit, a display, at least one processor, and a memory, the charging circuit is configured to charge the at least one battery or supply power to the at least one processor and/or the display by receiving charging power provided from an outside, and the at least one processor is configured to operate based on at least part of the power supplied from the charging circuit while the electronic device is in an off-state, and identify whether the at least one battery is in an overdischarged state, and based on identifying that the at least one battery is in the overdischarged state, to display, on the display, at least one image representing a state of the at least one battery among a plurality of images stored in the memory.

According to various embodiments of the disclosure, information associated with at least one of a network ID or a country code of the electronic device is obtained before a state of the electronic device is changed to the off-state.

According to various embodiments of the disclosure, the at least one image is identified based on information associated with at least one of a network ID or a country code of the electronic device.

According to various embodiments of the disclosure, the at least one image may include information associated with at least one of a country of the electronic device, a communication operator of the electronic device, or a manufacturer of the electronic device.

According to various embodiments of the disclosure, the at least one image may include information associated with a service center provided by a communication operator or a manufacturer.

According to various embodiments of the disclosure, the charging circuit may be configured to identify a voltage of the at least one battery, and based on the identified voltage being less than or equal to a predetermined threshold value, to provide a signal to the at least one processor.

According to various embodiments of the disclosure, the at least one processor may be configured to load the at least one image of the plurality of images based on the provided signal, and to display the loaded at least one image on the display.

According to various embodiments of the disclosure, the electronic device may further include a power management integrated circuit (PMIC), and the charging circuit is included in the PMIC.

According to various embodiments of the disclosure, the at least one battery may include a plurality of batteries, and the at least one processor may be configured to identify a battery state of each of the plurality of batteries, and to display the at least one image on the display based on identifying that one or more batteries of the plurality of batteries are in the overdischarged state based on identifying the battery state.

According to various embodiments of the disclosure, the at least one image may include information indicating the one or more batteries in the overdischarged state among the plurality of batteries.

According to various embodiments of the disclosure, the charging circuit may be further configured to identify whether a battery voltage of each of the plurality of batteries is less than or equal to a predetermined threshold voltage by identifying the battery voltage of each of the plurality of batteries, and to charge a portion of the plurality of batteries based on identifying that battery voltages of the portion of the plurality of batteries exceed the predetermined threshold value, and charging the one or more batteries which are identified as being in the overdischarged state may be stop.

According to various embodiments of the disclosure, a method of controlling an electronic device may include an operation of operating based on at least part of power supplied from a charging circuit of the electronic device while the electronic device is in an off-state, and identifying whether at least one battery of the electronic device is in an overdischarged state, and an operation of displaying, on a display of the electronic device, at least one image representing the state of the at least one battery among a plurality of images stored in a memory of the electronic device based on identifying that the at least one battery is in the overdischarged state.

According to various embodiments of the disclosure, information associated with at least one of a network ID or a country code of the electronic device is obtained before a state of the electronic device is changed to the off-state.

According to various embodiments of the disclosure, the at least one image is identified based on information associated with at least one of a network ID or a country code of the electronic device.

According to various embodiments of the disclosure, the at least one image includes information associated with at least one of a country of the electronic device, a communication operator of the electronic device, or a manufacturer of the electronic device.

According to various embodiments of the disclosure, the at least one image includes information associated with a service center provided by the communication operator or the manufacturer.

According to various embodiments of the disclosure, the method may further include an operation of identifying a voltage of the at least one battery, and an operation of providing a signal to at least one processor of the electronic device based on the identified voltage being less than or equal to a predetermined threshold value.

According to various embodiments of the disclosure, the operation of displaying at least one image may include an operation of loading at least one of the plurality of images based on the provided signal, and an operation of displaying the loaded at least one image on the display.

According to various embodiments of the disclosure, the operation of identifying whether the at least one battery is in the overdischarged state includes an operation of identifying a battery state of each of the plurality of batteries of the electronic device, and the operation of displaying the at least one image includes an operation of displaying at least one image on the display if at least one of the plurality of batteries is identified as being in the overdischarged state based on the identification of each battery state.

According to various embodiment of the disclosure, an electronic device may include a plurality of batteries, a charging circuit, a display, at least one processor, and a memory, and the at least one processor is configured to identify whether at least one of the plurality of batteries is in overdischarged state using the charging circuit while the electronic device in an off-state, and to display at least one image indicating the state of at least one battery based on identifying that the at least one battery is in the overdischarged state, and the at least one image may include information indicating at least one battery which is in the overdischarged state among the plurality of batteries.

According to various embodiments of the disclosure, the charging circuit may be further configured to identify a battery voltage of each of the plurality of batteries, so as to identify whether each battery voltage is less than or equal to a predetermined threshold voltage, and to charge some of the plurality of batteries if battery voltages of some of the plurality of batteries are identified as exceeding the predetermined threshold value, and charging the one or more batteries which are identified as being in the overdischarged state may be stop.

According to various embodiments of the disclosure, the charging circuit may be further configured to stop charging the plurality of batteries if the battery voltages of all the plurality of batteries are identified as being less than or equal to the predetermined threshold voltage.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components or operations may be omitted, or one or more other components or operations may be added. Alternatively or additionally, a plurality of components (e.g., modules or programs) may be integrated into a single component. In such a case, the integrated component may perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
at least one battery;
a charging circuit;
a display;
at least one processor; and
a memory,
wherein the charging circuit is configured to charge the at least one battery or supply power to the at least one processor and/or the display by receiving charging power provided from an outside, and
wherein the at least one processor is configured to:
while the electronic device is in an off-state, operate based on at least part of the power supplied from the charging circuit, and identify whether the at least one battery is in an overdischarged state, and
based on identifying that the at least one battery is in the overdischarged state, display, on the display, at least one image representing a state of the at least one battery among a plurality of images stored in the memory.

2. The electronic device of claim 1, wherein information associated with at least one of a network ID or a country code of the electronic device is obtained before a state of the electronic device is changed to the off-state.

3. The electronic device of claim 1, wherein the at least one image is identified based on information associated with at least one of a network identity (ID) or a country code of the electronic device.

4. The electronic device of claim 3, wherein the at least one image comprises:
information associated with at least one of a country of the electronic device, a communication operator of the electronic device, or a manufacturer of the electronic device; or
information associated with a service center provided by the communication operator or the manufacturer.

5. The electronic device of claim 1, wherein the charging circuit is configured to:
identify a voltage of the at least one battery; and
based on the identified voltage being less than or equal to a predetermined threshold value, provide a signal to the at least one processor.

6. The electronic device of claim 5, wherein the at least one processor is further configured to:
load the at least one image of the plurality of images based on the provided signal, and
display the loaded at least one image on the display.

7. The electronic device of claim 1, further comprising:
a power management integrated circuit (PMIC),
wherein the charging circuit is included in the PMIC.

8. The electronic device of claim 1,
wherein the at least one battery comprises a plurality of batteries, and
wherein the at least one processor is further configured to:
identify a battery state of each of the plurality of batteries, and
display the at least one image on the display based on identifying that one or more batteries among the plurality of batteries are in the overdischarged state based on identifying the battery state.

9. The electronic device of claim 8, wherein the at least one image comprises information indicating the one or more batteries in the overdischarged state among the plurality of batteries.

10. The electronic device of claim 8, wherein the charging circuit is further configured to:
identify whether a battery voltage of each of the plurality of batteries is less than or equal to a predetermined threshold voltage by identifying the battery voltage of each of the plurality of batteries,
based on identifying that battery voltages of a portion of the plurality of batteries exceed the predetermined threshold value, charge the portion of the plurality of batteries, and
stop charging the one or more batteries which are identified as being in the overdischarged state.

11. A method of controlling an electronic device, the method comprising:
operating based on at least part of power supplied from a charging circuit of the electronic device while the electronic device is in an off-state;
identifying whether at least one battery of the electronic device is in an overdischarged state; and
based on identifying that the at least one battery is in the overdischarged state, displaying, on a display of the electronic device, at least one image representing a state of the at least one battery among a plurality of images stored in a memory of the electronic device.

12. The method of claim 11, wherein information associated with at least one of a network ID or a country code of the electronic device is obtained before a state of the electronic device is changed to the off-state.

13. The method of claim 11, wherein the at least one image is identified based on information associated with at least one of a network ID or a country code of the electronic device.

14. The method of claim 13, wherein the at least one image comprises:

information associated with at least one of a country of the electronic device, a communication operator of the electronic device, or a manufacturer of the electronic device; or
information associated with a service center provided by the communication operator or the manufacturer.

15. The method of claim 11, further comprising:
identifying a voltage of the at least one battery; and
providing a signal to at least one processor of the electronic device based on the identified voltage being less than or equal to a predetermined threshold value.

16. The method of claim 15, further comprising:
loading the at least one image of the plurality of images based on the provided signal; and
displaying the loaded at least one image on the display.

17. The method of claim 11, further comprising:
identifying a battery state of each of the plurality of batteries; and
displaying the at least one image on the display based on identifying that one or more batteries among the plurality of batteries are in the overdischarged state based on identifying the battery state.

18. The method of claim 17, wherein the at least one image comprises information indicating the one or more batteries in the overdischarged state among the plurality of batteries.

19. The method of claim 17, further comprising:
identifying whether a battery voltage of each of the plurality of batteries is less than or equal to a predetermined threshold voltage by identifying the battery voltage of each of the plurality of batteries;
based on identifying that battery voltages of a portion of the plurality of batteries exceed the predetermined threshold value, charging the portion of the plurality of batteries; and
stopping charging the one or more batteries which are identified as being in the overdischarged state.

* * * * *